(12) United States Patent
Farmer et al.

(10) Patent No.: US 6,568,079 B2
(45) Date of Patent: May 27, 2003

(54) METHODS FOR REPLACING COMBUSTOR LINER PANELS

(75) Inventors: Gilbert Farmer, Cincinnati, OH (US); David Bruce Patterson, Mason, OH (US); Steven Allen Stiverson, Blanchester, OH (US); James Michael Caldwell, Alexandria, KY (US); Edward John Emilianowicz, West Chester, OH (US); Jeffrey Michael Martini, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 09/878,848

(22) Filed: Jun. 11, 2001

(65) Prior Publication Data

US 2002/0184762 A1 Dec. 12, 2002

(51) Int. Cl.⁷ .................................................. B23P 15/00
(52) U.S. Cl. .............................. 29/890.01; 29/402.03; 29/402.08; 29/889.1
(58) Field of Search ........................... 29/889.1, 890.01, 29/402.03, 402.08, 889, 889.2; 60/752, 750, 757, 758, 754, 39.36

(56) References Cited

U.S. PATENT DOCUMENTS

| 4,485,630 | A |   | 12/1984 | Kenworthy |           |
|-----------|---|---|---------|-----------|-----------|
| 5,142,871 | A |   | 9/1992  | Lampes et al. |       |
| 5,154,060 | A |   | 10/1992 | Walker et al. |       |
| 5,181,379 | A |   | 1/1993  | Wakeman et al. |      |
| 5,241,827 | A |   | 9/1993  | Lampes    |           |
| 5,261,223 | A |   | 11/1993 | Foltz     |           |
| 5,279,127 | A |   | 1/1994  | Napoli    |           |
| 5,307,637 | A |   | 5/1994  | Stickles et al. |     |
| 5,323,604 | A |   | 6/1994  | Ekstedt et al. |      |
| 5,329,761 | A |   | 7/1994  | Ablett et al. |       |
| 5,430,935 | A | * | 7/1995  | Yaworsky et al. | 29/889.1 |
| 5,839,643 | A | * | 11/1998 | Inoue et al. | 228/119 |
| 6,049,978 | A | * | 4/2000  | Arnold    | 29/889.1  |
| 6,163,959 | A | * | 12/2000 | Arraitz et al. | 29/889.1 |
| 6,345,441 | B1| * | 2/2002  | Farmer et al. | 29/889.1 |
| 6,434,821 | B1| * | 8/2002  | Nelson et al. | 29/888.01 |

* cited by examiner

Primary Examiner—I Cuda Rosenbaum
(74) Attorney, Agent, or Firm—Nathan D. Herkamp; Armstrong Teasdale LLP; Robert B. Reeser, III

(57) ABSTRACT

A replacement method facilitates replacing of a portion of a combustor liner within a gas turbine engine combustor in a cost-effective and reliable manner. The combustor includes a combustion zone that is defined by an inner and an outer liner. The inner and outer liners each include a series of panels and a plurality of nuggets formed by adjacent panels. The method includes the steps of cutting between an outer surface and an inner surface of at least one liner panel, removing at least one panel that is adjacent the area of the liner that was cut, and installing a replacement panel into the combustor for each panel that was removed from the combustor.

16 Claims, 4 Drawing Sheets

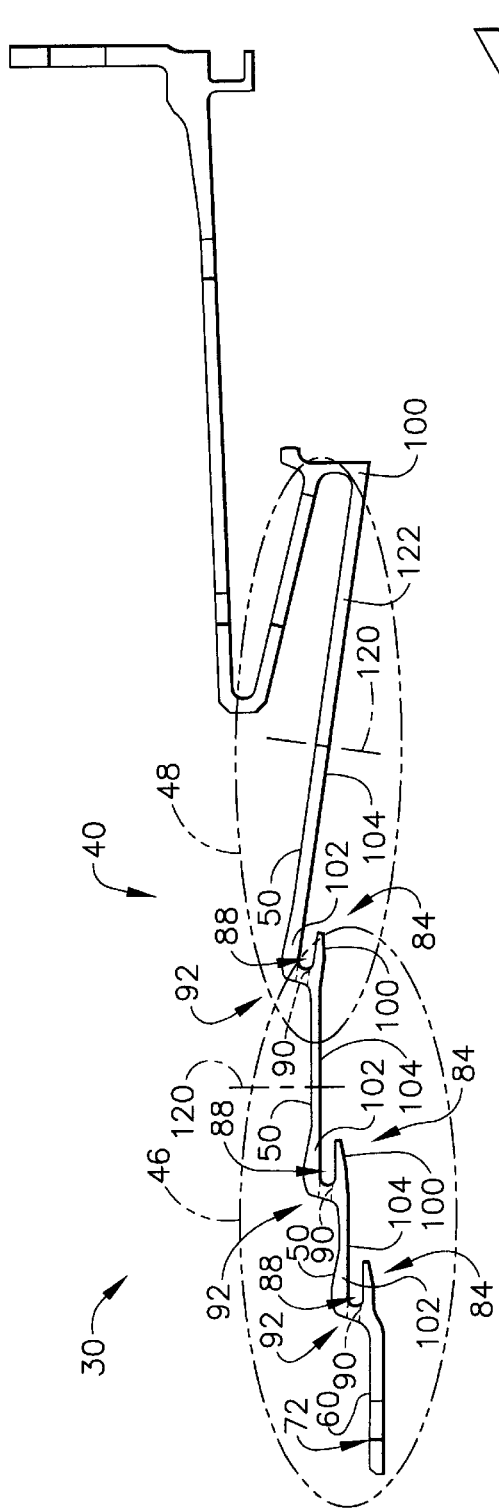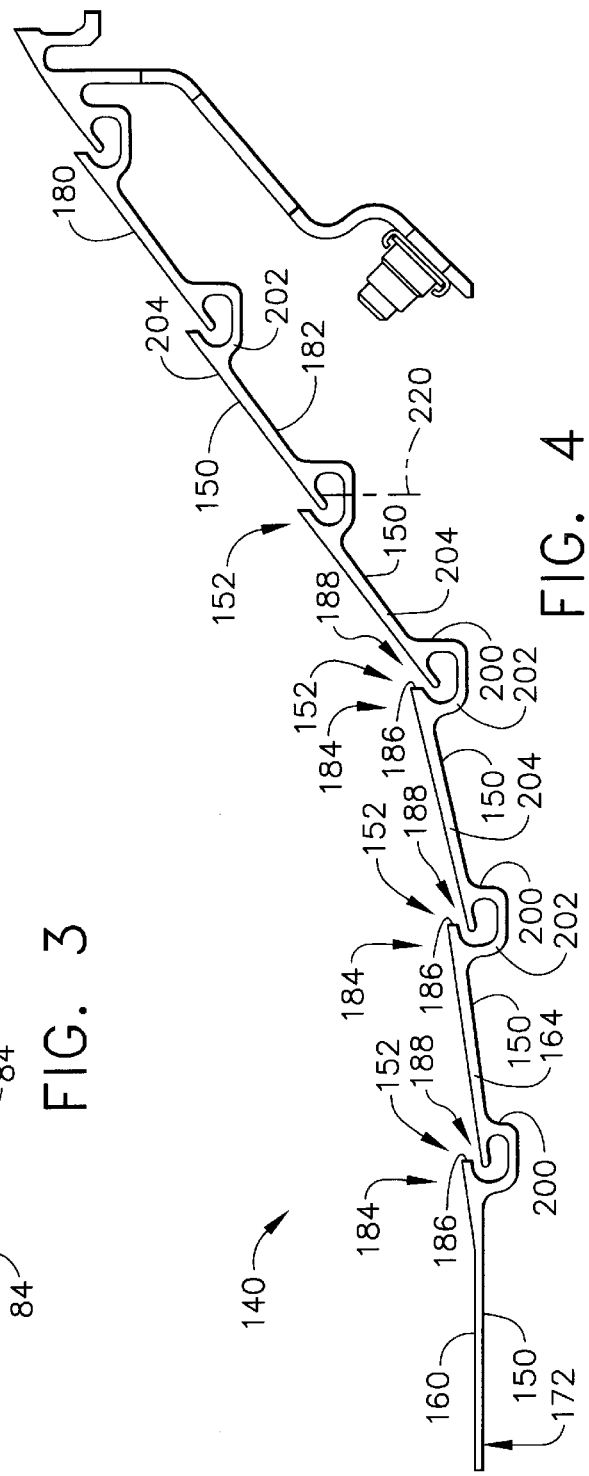

METHODS FOR REPLACING COMBUSTOR LINER PANELS

BACKGROUND OF THE INVENTION

This invention relates generally to gas turbine engine, and more particularly, to methods for replacing combustor liner panels used with gas turbine engines.

A turbine engine includes a compressor for compressing air which is mixed with a fuel and channeled to a combustor wherein the mixture is ignited within a combustion chamber for generating hot combustion gases. At least some known combustors include a dome assembly, a cowling, and liners to channel the combustion gases to a turbine, which extracts energy from the combustion gases for powering the compressor, as well as producing useful work to propel an aircraft in flight or to power a load, such as an electrical generator. The liners are coupled to the dome assembly with the cowling, and extend downstream from the cowling to define the combustion chamber.

At least some known liners include a plurality of panels that are connected together with riveted, bolted, or welded connections. A portion of the panels include cooling nuggets formed between adjacent panels, that extend radially outwardly from the panels and away from the combustion chamber. Accordingly, such cooling nuggets are not subjected to the same degree of heat as portions of the panels adjacent the combustion chamber, and as such, during operation thermal stresses may be induced within the panels. Over time, continued operation with thermal stresses may cause panels to thermally fatigue, causing weakening and/or cracking to develop within the panels.

Current repair methods include welding thermal fatigue cracks. Additionally, patches may be attached to areas of panels that are weakened by thermal stresses. However, if the thermal stresses have induced thermal fatigue or distress in larger areas of the panels or in a plurality of panels, the combustor may not have enough structural integrity within such panels to enable patches to be attached. In such cases, repair of such panels is not a feasible option, and instead the entire combustor liner is replaced. Because the liner is coupled to the cowl and the dome assembly, often the entire combustor must be disassembled for the liner to be replaced. Furthermore, when the fasteners are removed from the cowl and dome assembly, precise dimensional relations between the components may be altered and as a result, special tooling may be required during re-assembly. Thus, replacing a combustor liner including cooling nuggets may be a time-consuming and expensive process.

BRIEF SUMMARY OF THE INVENTION

In an exemplary embodiment, a method facilitates replacing of a portion of a combustor liner within a gas turbine engine combustor in a cost-effective and reliable manner. The combustor includes a combustion zone that is defined by an inner and an outer liner. The inner and outer liners each include a series of panels and a plurality of nuggets formed by adjacent panels. The method includes the steps of cutting between an outer surface and an inner surface of at least one liner panel, removing at least one panel that is adjacent the area of the liner that was cut, and installing a replacement panel into the combustor for each panel that was removed from the combustor.

In another aspect of the invention, a method is used to replace at least one deteriorated combustor liner panel within a gas turbine engine combustor that includes an annular liner including a multinugget region, a mulithole region, and an inner surface. The multihole region extends downstream from the multinugget region, and the method includes the steps of cutting through at least one of the liner multinugget region and the liner multihole region, downstream from the at least one combustor liner panel to be replaced, removing the at least one deteriorated combustor liner panel from the combustor, and welding at least one replacement panel to at least one existing panel within the combustor for each deteriorated combustor liner panel removed.

BRIEF DESCRIPTION OF THE DRAWINGS

FIG. 3 is an enlarged view of a combustor liner used with the combustor shown in FIG. 2 taken along area 3;

FIG. 4 is an enlarged cross-sectional view of an alternative embodiment of a combustor liner that may be used with the gas turbine engine shown in FIG. 1.

DETAILED DESCRIPTION OF THE INVENTION

Figure 1:
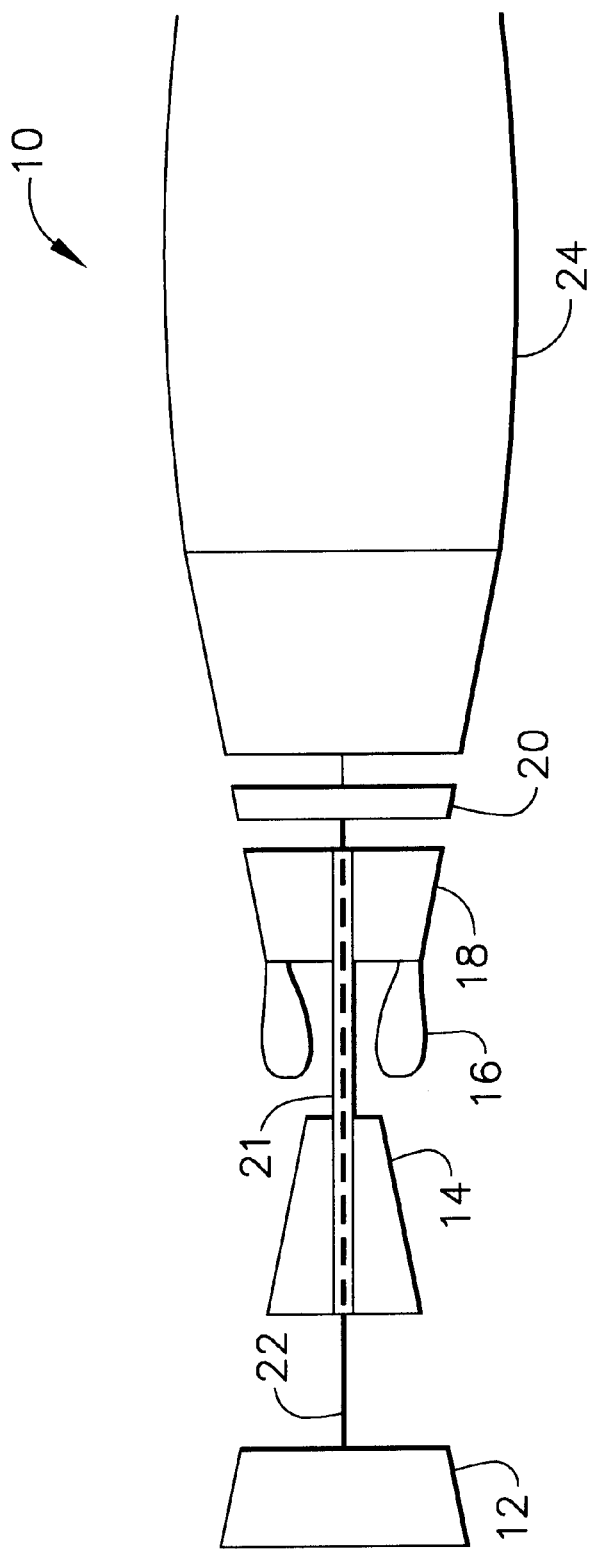
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is a GE90 engine commercially available from General Electric Aircraft Engines, Cincinnati, Ohio. In another embodiment, gas turbine engine 10 is a CF engine commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
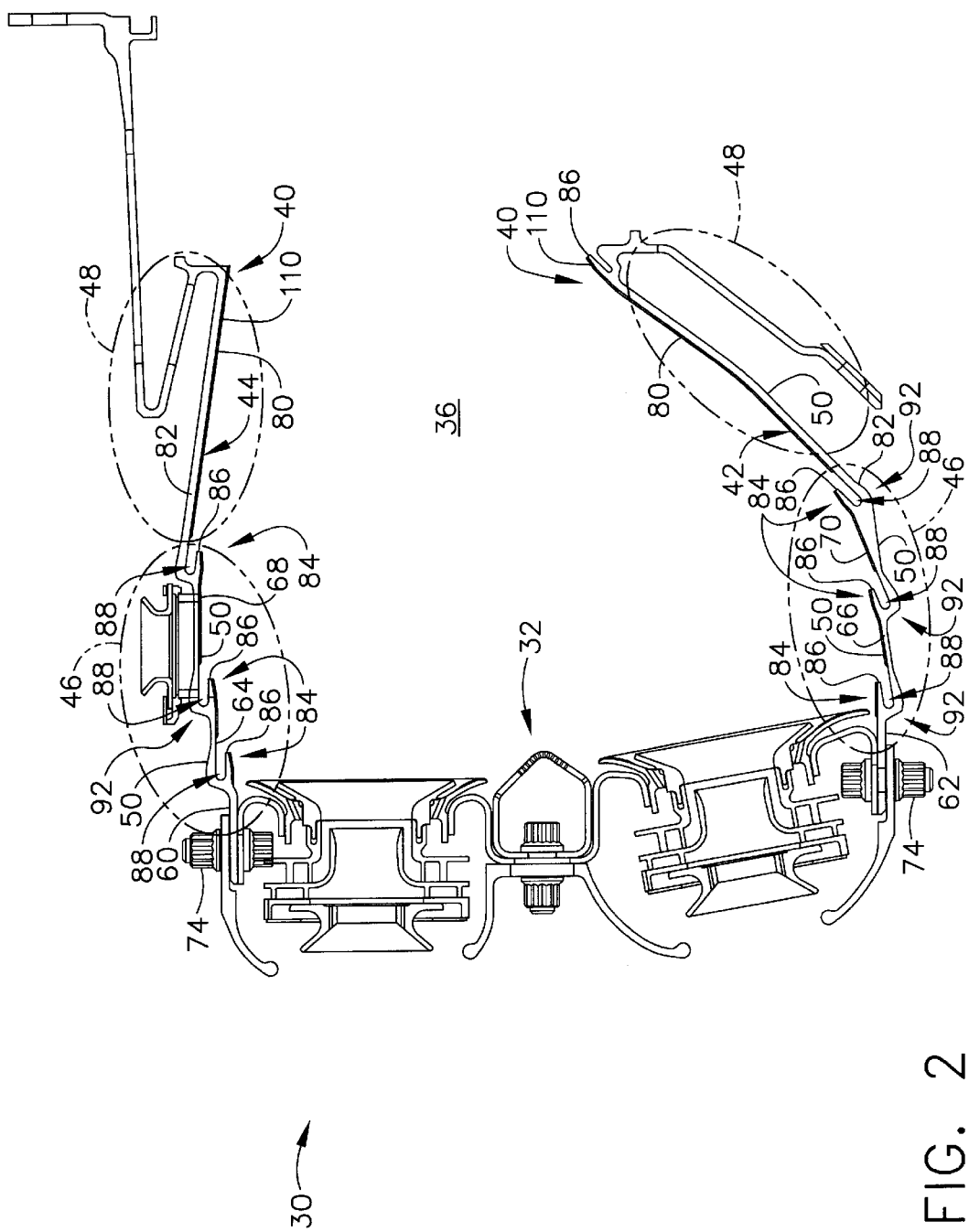
FIG. 2 is a partial cross-sectional view of a combustor assembly that may be used with the gas turbine engine shown in FIG. 1.

FIG. 2 is a partial cross-sectional view of a combustor 30. FIG. 3 is an enlarged view of a portion of combustor 30. Combustor 30 may be used with gas turbine engine 10 shown in FIG. 1, and includes a dome assembly 32. A fuel injector (not shown) extends into dome assembly 32 and injects atomized fuel through dome assembly 32 into a combustion zone 36 of combustor 30 to form an air-fuel mixture that is ignited downstream of the fuel injector Combustion zone 36 is formed by annular, radially outer and radially inner supporting members (not shown) and combustor liners 40. Combustor liners 40 shield the outer and inner supporting members from the heat generated within combustion zone 36 and includes an inner liner 42 and an outer liner 44. Each liner 42 and 44 is annular and includes a multinugget region 46 and a multihole region 48. Each multinugget region 46 extends from dome assembly 32 downstream to each multihole region 48.

Liners 42 and 44 define combustion zone 36. Combustion zone 36 extends from dome assembly 32 downstream to a turbine nozzle (not shown). Outer and inner liners 44 and 42 each include a plurality of panels 50 which include a series of steps 52, each of which form a distinct portion of combustor liner 40.

Outer liner 44 and inner liner 42 each include a bolt band 60 and 62, respectively, and a first panel 64 and 66, respectively. Outer bolt band 60 and inner bolt band 62 are positioned adjacent to dome assembly 32 and extend downstream from dome assembly 32 to first panels 64 and 66, respectively. First panels 64 and 66 are connected downstream from bolt bands 60 and 62, respectively. Each adjacent downstream panel 50 is numbered sequentially, such that second panels 68 and 70 are connected downstream from respective first panels 64 and 66. Bolt bands 60 and 62 include a plurality of openings 72 sized to receive fasteners 74 therethrough. Fasteners 74 secure liners 42 and 44, bolt bands 60 and 62, and a cowl assembly 78 to dome assembly 32.

Each combustor panel 50 includes a combustor liner surface 80, an exterior surface 82, and an overhang portion 84. Combustor liner surface 80 extends from dome assembly 32 to the turbine nozzle. Combustor liner surface 80 and exterior surface 82 are connected together at overhang portion 84 and form a rear facing edge 86. A plurality of air cooling features 88 separate adjacent combustor panels 50.

Air cooling features 88 include openings 90 which receive air therethrough from an air plenum (not shown) such that a thin protective boundary of air is formed between high temperature combustion gases and combustor liner surface 80. Furthermore, openings 90 permit convective cooling of combustor liner 40. Specifically, openings 90 extend through features 88 which are formed between adjacent panels 50 and radially inward from nuggets 92 formed by panels 50. Panels 50 are connected serially, such that each panel downstream end 100 is connected to an upstream end 102 of an adjacent downstream panel 50. Nuggets 92 are formed between adjacent connected panels respective downstream and upstream ends 100 and 102.

Liner multinugget region 46 includes a plurality of nuggets 92. In the exemplary embodiment, region 46 includes three nuggets 92. Liner multihole region 48 includes a plurality of openings (not shown).

A layer 110 of thermal barrier material is applied on combustor liner surface 80. Thermal barrier material further insulates combustor liner surface 80 from high temperature combustion gases. In an exemplary embodiment, thermal barrier coating material is commercially available from Englehart Industries, Wilmington Mass.

During operation, as atomized fuel is injecting into combustion zone 36 and ignited, heat is generated within zone 36. Although air enters combustion zone 36 through cooling features 88 and forms a thin protective boundary of air along combustor liner surface 80, a variation in exposure of combustor liner surfaces to high temperatures may induce thermal stresses into panels 50. As a result of continued exposure to thermal stresses, over time, panels 50 may become deteriorated.

Deteriorated regions of combustor liner 40 may be removed and replaced using the methods described herein. More specifically, deteriorated regions of either liner multinugget region 46 and/or liner multihole region 44 may be removed and replace using the methods described herein. If a field returned engine, such as engine 10, indicates that combustor liner multinugget region 46 includes at least one deteriorated panel 50, a circumferential cut is made through combustor liner 40 to remove deteriorated panels 50. More specifically, as shown in FIG. 3, the cut is made radially through liner 40 and through a panel body 104, as illustrated with line 120, such that the cut extends from liner exterior surface 82 to liner interior surface 80, and such that a portion 122 of panel body 104 of panel 50 being cut remains secured within combustor 30. Furthermore, the cut is extended through liner 40 downstream from deteriorated panels 50 being replaced. Fasteners 74 may be loosened to separate deteriorated panels 50 from liner 40 for removal. Alternatively, a second cut may then be made upstream from deteriorated panels 50 being replaced, such that deteriorated panels 50 are separated and removable from combustor liner 40.

After deteriorated panels 50 are removed from combustor liners 40, replacement panels (not shown) may be installed into combustor liners 42 and/or 44. The replacement panels are formed to include a nugget configuration that is substantially identical to that portion of liner 40 being replaced. In one embodiment, at least one of a forging, roll welded ring, or a casting is used as a replacement panel.

The replacement panel is then welded into combustor liner 42 and/or 44, such that the replacement panel is welded to an existing panel 50 that remains secured within combustor liner 42 and/or 44. More specifically, a downstream side (not shown) of a body of the replacement panel is welded to panel body portion 122 within combustor 30. In one embodiment, electron beam, EB, welding is used to secure the replacement panel within combustor 30. In another embodiment, tungsten inert gas, TIG, welding is used to secure the replacement panel within combustor 30. Thermal barrier coating material may then be applied on replacement panel combustor liner surface 80, and fastener 74 is then re-tightened.

If a field returned engine, such as engine 10, indicates that combustor liner multihole region 48 includes at least one deteriorated panel 50, a cut is made through combustor liner 40 to remove deteriorated panels 50. More specifically, as shown in FIG. 3, the circumferential cut is made radially through liner 40 and through a panel body 104, as illustrated with line 120, such that the cut extends from liner exterior surface 82 to liner surface 80, and such that panel body portion 122 remains secured within combustor 30. Furthermore, the cut is extended through liner 40 downstream from deteriorated panels 50 being replaced. A second cut may then be made within multihole region 48 and upstream from deteriorated panels 50 being replaced, such that a deteriorated portion of multihole region 48 is separated and removable from combustor liner 40. Fasteners 74 may then be loosened to separate the deteriorated portion and multinugget region 46 from liner 40 for removal.

After deteriorated portions of multihole region 48 are removed from combustor 30, a replacement panel may be installed into combustor 30. In one embodiment, at least one of a forging, roll welded ring, a casting, or a sheet metal panel is manufactured and used as a replacement panel. The multihole region openings may be formed after the replacement panel is attached. In one embodiment, the openings are formed with a laser process. In another embodiment, the openings are formed using an electron discharge machining, EDM, process. In yet another embodiment, the newly formed openings may be sized differently, reduced, or repositioned, to facilitate improving cooling of combustor 30.

The replacement panel is then welded to an existing panel 50 that remains secured within combustor 30. More specifically, a downstream side (not shown) of a body of the replacement panel is welded to panel body portion 122 within combustor 30. In one embodiment, electron beam, EB, welding is used to secure the replacement panel within combustor 30. In another embodiment, tungsten inert gas, TIG, welding is used to secure the replacement panel within combustor 30. Thermal barrier material may then be applied on replacement panel combustor liner surface 80.

Because deteriorated liners are replaced using the method described herein, combustors 30 are returned to service using a replacement process that facilitates improved savings in comparison to removing and replacing entire combustor liners 40. Furthermore, because the replacement panels are formed to be substantially identical to originally installed panels 50, aerodynamic performance and combustor performance are not adversely impacted by the replacement panels.

Figure 5:
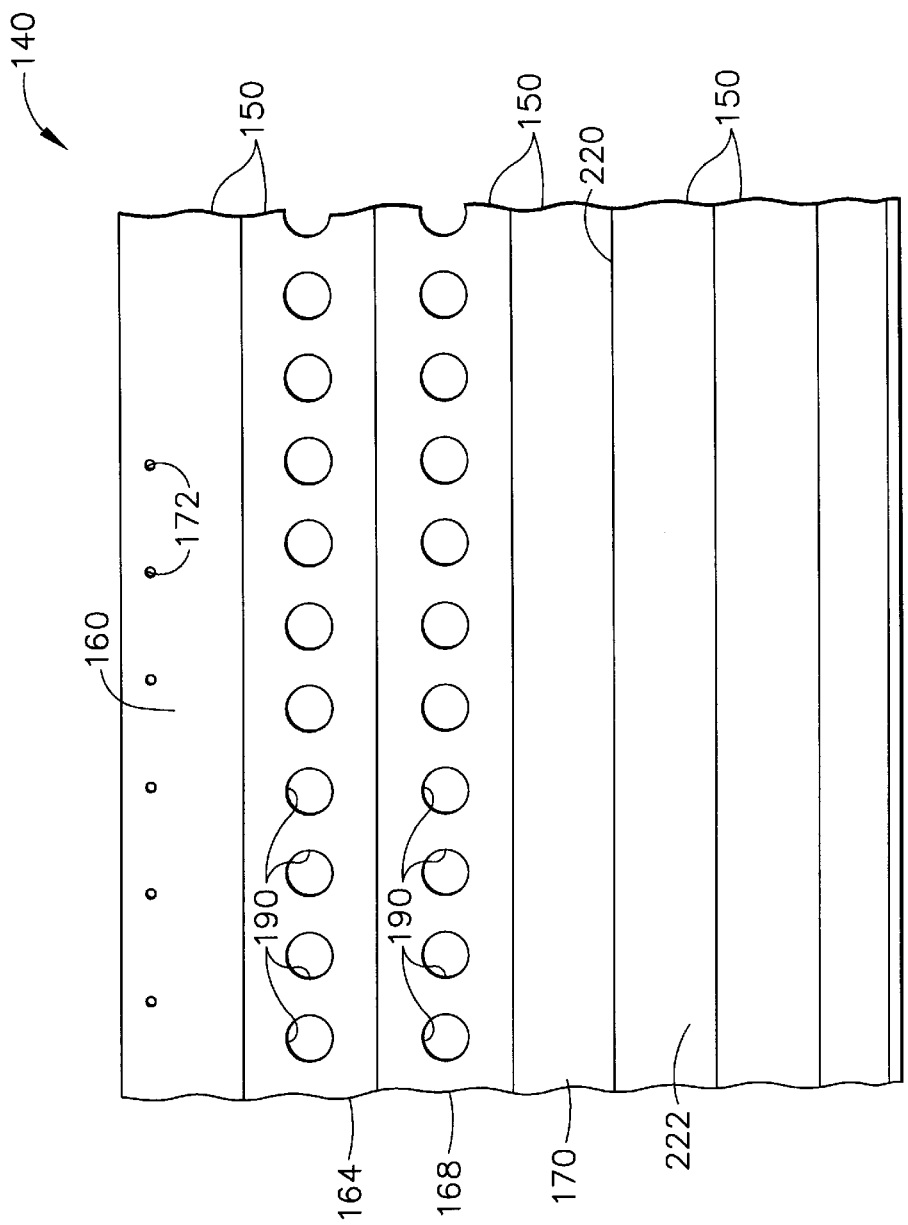
FIG. 5 is an enlarged plan view of the combustor liner shown in FIG. 4.

FIG. 4 is an enlarged cross-sectional view of an alternative embodiment of an inner combustor liner 140 that may be used with gas turbine engine 10 (shown in FIG. 1). FIG. 5 is an enlarged plan view of combustor liner 140. Liner 140 is substantially similar to liners 40 (shown in FIGS. 2 and 3), and is installed within a combustor (not shown). The combustor includes a combustor liner that includes annular inner liner 140 and an annular outer liner (not shown) that is formed substantially similarly to inner liner 140. Inner liner 140 includes a plurality of panels 150 which include a series of steps 152, each of which form a distinct portion of combustor liner 140.

Panels 150 are connected serially. Inner liner 140 includes a bolt band 160 and a first panel 164. Inner bolt band 160 is coupled to a dome assembly (not shown) and extends downstream from the dome assembly to first panels 164. First panel 164 and panels 150 are connected downstream from bolt band 160, such that each adjacent downstream panel 150 is numbered sequentially. Accordingly, a second panel 168 is connected downstream from first panel 164, and a third panel 170 is connected downstream from second panel 168. Bolt band 160 includes a plurality of openings 172 sized to receive fasteners 74 (shown in FIG. 2) for securing liner 140 to the dome assembly.

Each combustor panel 150 includes a combustor liner surface 180, an exterior surface 182, and an overhang portion 184. Combustor liner surface 180 extends from the dome assembly to the turbine nozzle. Combustor liner surface 180 and exterior surface 182 are connected together at overhang portion 184 and form a rear facing edge 186. A plurality of air cooling features 188 separate adjacent combustor panels 150.

Air cooling features 188 include a plurality of openings 190 which receive air therethrough from an air plenum (not shown) such that a thin protective boundary of air is formed between high temperature combustion gases and combustor liner surface 180. Openings 190 are known as dilution openings and extend between liner surface 180 and exterior surface 182 to facilitate mixing of combustion gases within the combustor. In the exemplary embodiment, openings 190 are substantially circular. Specifically, each panel 150 includes an upstream end 200, a downstream end 202, and a body 204 extending therebetween. Panels 150 are connected, such that each panel downstream end 202 is connected to an upstream end 200 of an adjacent downstream panel 150. Nuggets 192 are formed between adjacent connected panels respective downstream and upstream ends 202 and 200. Nuggets 192 are known as super slot nuggets. In the exemplary embodiment, liner 140 includes six nuggets 192.

In an alternative embodiment, a layer of thermal barrier material (not shown) is applied on combustor liner surface 180, and enhances the thermal protection of combustor liner surface 180 from high temperature combustion gases.

Deteriorated regions of combustor liner 140 may be removed and replaced using the methods described herein. If a field returned engine, such as engine 10, indicates that combustor liner 140 includes at least one deteriorated panel 150, a cut is made circumferentially through combustor liner 140 to remove deteriorated panels 150. More specifically, as shown in FIG. 4, the circumferential cut is made radially through liner 140 and through a nugget 192, as illustrated with line 220, such that the cut extends from liner exterior surface 182 to liner surface 180. In one embodiment, the cut is made between third panel 170 and a fourth panel 222. Furthermore, the cut is extended through liner 140 downstream from deteriorated panels 50 being replaced.

After deteriorated portions liner 140 are removed from the combustor, a replacement panel (not shown) may be installed into combustor liner 140. In one embodiment, at least one of a forging, roll welded ring, a casting, or a sheet metal panel is manufactured and used as a replacement panel.

The replacement panel is then welded into combustor liner 140, such that the replacement panel is secured within the combustor. More specifically, a downstream end (not shown) of the replacement panel is welded to an existing panel 150 such that a nugget 192 is formed between the replacement panel and panel 150. In one embodiment, electron beam, EB, welding is used to secure the replacement panel within combustor liner 140. In another embodiment, tungsten inert gas, TIG, welding is used to secure the replacement panel within combustor liner 140. Thermal barrier material may then be applied on replacement panel combustor liner surface 180.

The above-described combustor liner replacement method is cost-effective and highly reliable. The method includes the steps of removing deteriorated panels from the combustor liner, such that deteriorated panels may be replaced with replacement panels. In one embodiment, deteriorated panels are removed by cutting through the body of the panel, and replacement panels are then welded to into the combustor liner. As a result, a method is provided which enables deteriorated combustor liner panels to be removed and replaced in a cost-effective and reliable manner.

While the invention has been described in terms of various specific embodiments, those skilled in the art will recognize that the invention can be practiced with modification within the spirit and scope of the claims.

What is claimed is:

1. A method for replacing a gas turbine engine combustor liner panel, the combustor having a combustion zone formed by inner and outer liners, the inner and outer liners each including a series of panels and a plurality of cooling features, the cooling features formed by overhanging portions of the inner and outer liner panels, the cooling featuress between adjacent panels, said method comprising the steps of:

removing at least one panel from the combustor; and
installing at least one replacement panel into the combustor such that the series of panels are arranged in steps relative to one another.

2. A method in accordance with claim 1 wherein each panel includes an upstream end, a downstream end, and a body extending therebetween, said step of removing at least one panel further comprising the step of cutting radially through at least one panel body from an outer surface of the panel to an inner surface of the panel.

3. A method in accordance with claim 1 wherein said step of installing at least one replacement panel further comprises the step of welding a body of each replacement panel to a panel body secured within the combustor.

4. A method in accordance with claim 3 wherein said step of welding a body further comprises the step of using at least one of an EB welding process and a TIG welding process to secure the replacement panel within the combustor.

5. A method in accordance with claim 1 wherein each panel includes an inner surface and an outer surface, said method further comprising the step of applying thermal barrier coating material to the inner surface of each replacement panel attached within the combustor.

6. A method for replacing a portion of a combustor liner within a gas turbine engine combustor, the combustor having a combustion zone formed by an inner and outer liner, the inner and outer liners each including a series of panels and a plurality of nuggets, the nuggets formed by adjacent panels, said method comprising the steps of:
    cutting between an outer surface and an inner surface of at least one liner panel;
    removing at least one panel adjacent an area of the liner cut; and
    installing a replacement panel into the combustor to replace each panel removed from the combustor.

7. A method in accordance with claim 6 wherein said step of cutting between an outer surface and an inner surface further comprises the step of cutting through a panel downstream from a nugget.

8. A method in accordance with claim 6 wherein said step of cutting between an outer surface and an inner surface further comprises the step of cutting through a panel body.

9. A method in accordance with claim 8 wherein said step of installing a replacement panel further comprises the step of welding each replacement panel to respective existing panels secured within the combustor.

10. A method in accordance with claim 9 wherein said step of welding each replacement panel further comprises the step of welding a body of each replacement panel to respective panel bodies of existing panels secured within the combustor.

11. A method in accordance with claim 6 further comprising the step of applying thermal barrier coating material to the inner surface of each replacement panel attached within the combustor.

12. A method for replacing at least one deteriorated combustor liner panel within a gas turbine engine combustor including an annular liner including a multinugget region, a mulithole region, and an inner surface, the multihole region extending downstream from the multinugget region, said method comprising the steps of:
    cutting through at least one of the liner multinugget region and the liner multihole region downstream from the at least one deteriorated combustor liner panel to be replaced;
    removing the at least one deteriorated combustor liner panel from the combustor; and
    welding at least one replacement panel to at least one existing panel within the combustor for each deteriorated combustor liner panel removed.

13. A method in accordance with claim 12 wherein said step of welding at least one replacement liner further comprises the step of using at least one of an EB welding process and a TIG welding process to secure each replacement panel to each respective existing panel within the combustor.

14. A method in accordance with claim 13 wherein each panel includes an upstream end, a downstream end, and a body extending therebetween, said step of cutting through at least one of the liner multinugget region and the liner multihole region further comprises the step of cutting through a panel body within the liner multinugget region.

15. A method in accordance with claim 14 wherein each panel includes an upstream end, a downstream end, and a body extending therebetween, said step of cutting through at least one of the liner multinugget region and the liner multihole region further comprises the step of cutting through a panel body within the liner multihole region.

16. A method in accordance with claim 14 further comprising the step of applying thermal barrier material to the inner surface of each replacement panel welded into the combustor.

* * * * *

UNITED STATES PATENT AND TRADEMARK OFFICE
CERTIFICATE OF CORRECTION

PATENT NO.     : 6,568,079 B2
DATED          : May 27, 2003
INVENTOR(S)    : Farmer et al.

It is certified that error appears in the above-identified patent and that said Letters Patent is hereby corrected as shown below:

Column 6,
Line 54, delete "featuress" and insert therefor -- features --.

Column 8,
Line 8, delete "mulithole" and insert therefor -- multihole --.

Signed and Sealed this

Twelfth Day of August, 2003

JAMES E. ROGAN
*Director of the United States Patent and Trademark Office*